(12) United States Patent
Sakakibara et al.

(10) Patent No.: US 6,993,633 B1
(45) Date of Patent: Jan. 31, 2006

(54) COMPUTER SYSTEM UTILIZING SPECULATIVE READ REQUESTS TO CACHE MEMORY

(75) Inventors: Tadayuki Sakakibara, Kamakura (JP); Isao Ohara, Hadano (JP); Hideya Akashi, Kunitachi (JP); Yuji Tsushima, Hadano (JP); Satoshi Muraoka, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 559 days.

(21) Appl. No.: 09/628,718

(22) Filed: Jul. 28, 2000

(30) Foreign Application Priority Data

Jul. 30, 1999 (JP) ................................. 11-216614

(51) Int. Cl.
*G06F 9/38* (2006.01)

(52) U.S. Cl. ....................... 711/146; 711/124; 711/119; 711/204; 711/213

(58) Field of Classification Search ................ 711/122, 711/124, 119, 146, 204, 213
See application file for complete search history.

(56) References Cited

U.S. PATENT DOCUMENTS

| | | | | | |
|---|---|---|---|---|---|
| 5,353,424 A | | 10/1994 | Partovi et al. | | |
| 5,802,576 A | * | 9/1998 | Tzeng et al. | ................ | 711/146 |
| 5,813,036 A | * | 9/1998 | Ghosh et al. | ............... | 711/146 |
| 5,933,860 A | * | 8/1999 | Emer et al. | .................. | 711/213 |
| 6,006,317 A | * | 12/1999 | Ramagopal et al. | .......... | 712/23 |
| 6,073,217 A | * | 6/2000 | Mahalingaiah et al. | ..... | 711/146 |
| 6,321,307 B1 | * | 11/2001 | Maguire et al. | ............ | 711/146 |
| 6,457,101 B1 | * | 9/2002 | Bauman et al. | ............. | 711/122 |
| 6,553,463 B1 | * | 4/2003 | Arimilli et al. | ............. | 711/146 |

FOREIGN PATENT DOCUMENTS

| | | |
|---|---|---|
| JP | 5225053 | 9/1993 |
| JP | 9128346 | 5/1997 |

* cited by examiner

*Primary Examiner*—B. James Peikari
(74) *Attorney, Agent, or Firm*—Mattingly, Stanger, Malur & Brundidge, P.C.

(57) ABSTRACT

A cache data control system and method for a computer system in which in a memory read processing, a coherent controller issues an advanced speculative read request for (speculatively) reading data from a cache data section in advance to a cache data controller, before reading a cache tag from a cache tag section and conducting cache hit check. If a cache hit has occurred, the cache data controller returns the data subjected to speculative reading as response data, at the time when the cache data controller has received a read request issued by the coherent controller.

24 Claims, 11 Drawing Sheets

COMPUTER SYSTEM UTILIZING SPECULATIVE READ REQUESTS TO CACHE MEMORY

BACKGROUND OF THE INVENTION

The present invention relates to a computer system, and in particular to a speculative read control scheme of cache data in a computer system having a cache between a CPU and a main memory.

DESCRIPTION OF THE RELATED ART

In recent years, improvements in performance of CPUs has been increasing faster than improvements in performance of memories causing their performance differences to become wider as time passes. A cache which operates faster than the main memory and which stores a part of contents of the main memory is used to absorb such a performance difference between the CPU and the memory and shorten the effective memory access time.

Selection of the cache capacity in a computer system largely depends upon the configuration of the computer system. In many cases, a high performance CPU has a cache of large capacity. In the case where a large number of CPUs are connected, approximately 2 to 8 CPUs are connected by a bus or a switch. In the case where more CPUs are connected, they are further connected by a bus or a switch. In many cases, a hierarchical memory system is thus formed. If such a configuration is adopted, then the access latency between the CPU and the main memory increases, and it exerts a great influence upon the performance in the case where a cache miss has occurred in a CPU. Therefore, it is necessary to provide a cache in the highest class having approximately 2 to 8 CPUs connected and controlled by a bus or a switch, and thereby avoid the performance degradation when cache overflow of the CPUs has occurred. For example, in Japanese Patent Application number JP-A-9-128346, a cache configuration example of such a hierarchical bus system is disclosed. The cache capacity at this time needs to be at least the total cache capacity of all CPUs connected above it. The reason can be explained as follows. When overflow has occurred in a CPU cache in the case where the above described cache capacity is equal to or less than the capacity of the CPU cache, cache overflow easily occurs also in classes located below the class, resulting in a fear of significant degradation of system performance.

Fast devices such as SRAMs are typically used in the cache in order to implement the fast access of the cache. In a typical configuration, a cache tag (tag address) and cache data are stored in the same location in this SRAM. When processing a read request, the cache tag and the cache data are simultaneously read out. The cache tag is checked with a request address. In the case of a hit, the cache data can be used immediately. However, SRAMs are lower than DRAMs used in the main memory or the like in degree of integration by at least one order. For forming a large capacity cache, it is necessary to use a large number of SRAMs. In the case where a large number of SRAMs are used, interfaces with a large number of SRAMs must be formed. Therefore, the number of pins of an LSI for controlling the cache increases, and some of the pins cannot be accommodated in one LSI. The cache tag portion is used for cache hit check. The increase of time caused by this hit check directly results in an increase of memory access latency. Therefore, a LSI having an interface with the cache tag portion needs to be accommodated in the same LSI as the CPU bus. By making a LSI having an interface with the cache data portion different from the LSI including the CPU bus and providing the interface with a data width nearly equal to the CPU bus width, the pin neck of LSIs can be eliminated.

On the other hand, as a scheme for improving the hit factor of the cache, there is a set associative scheme. For example, in Japanese Patent Application number JP-A-5-225053, there are disclosed a scheme of conducting tag comparison of a set associative cache and its speed increase.

In hit check in the set associative scheme, cache tags of a plurality of cache lines of a plurality of ways are read out, and hit check is conducted simultaneously in a plurality of lines. At this time, it remains to be seen which data of a plurality of lines is used until the cache hit check is completed. In a cache (on chip cache) mounted on a CPU, it is typical to adopt such a scheme that cache access latency is reduced by conducting readout of the cache data simultaneously with readout of the cache tag and selecting only necessary data after the cache hit check has been completed.

Figure 12:
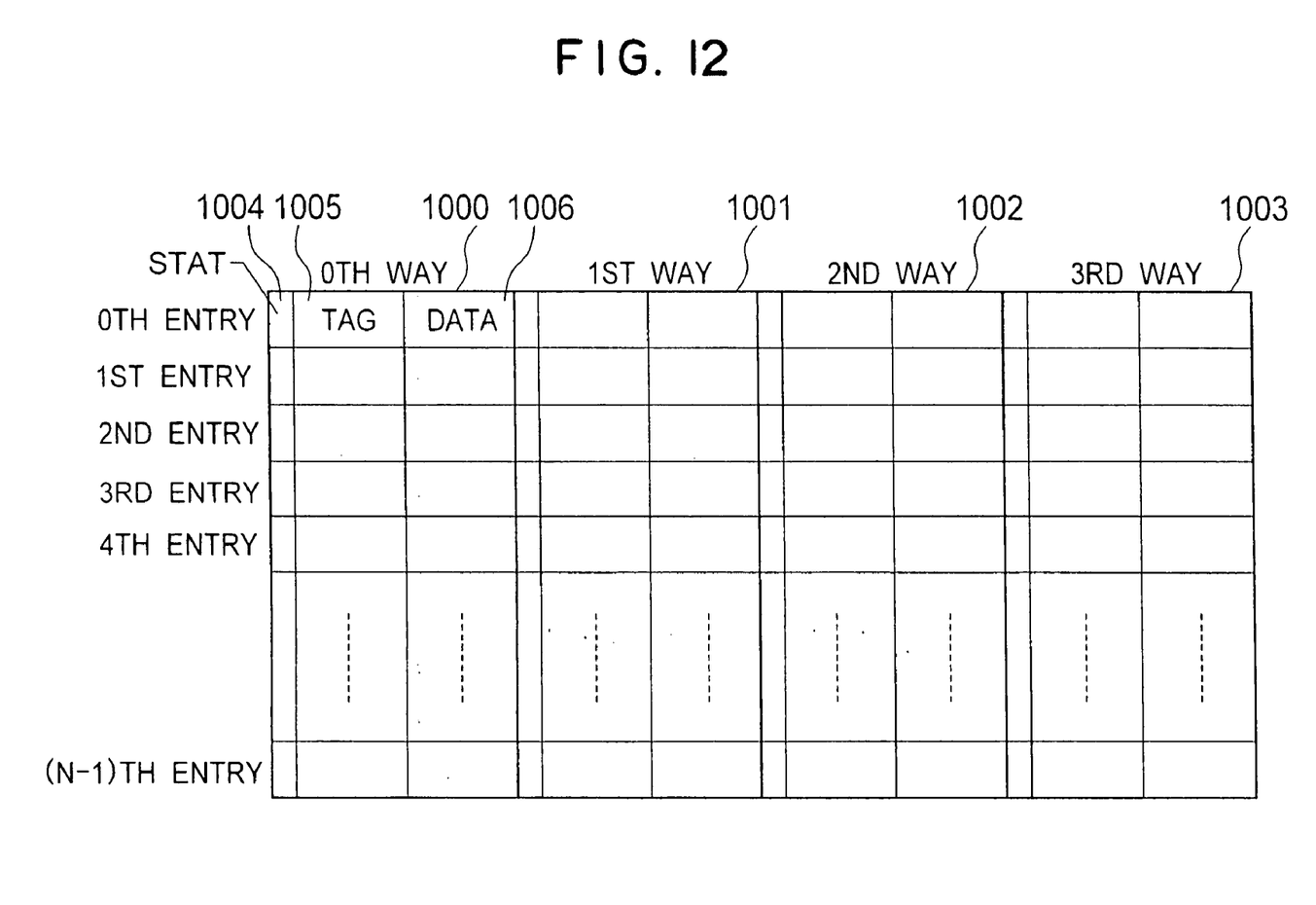
FIG. 12 is a diagram showing a configuration example of a conventional 4-way set associative cache.

FIG. 12 shows an example of a configuration of such a set associative cache. FIG. 12 shows a 4-way set associative cache including N entries.

Each entry includes four ways, a 0th way 1000, a first way 1001, a second way 1002, and a third way 1003. Information contained in the cache includes STAT 1004 indicating the state (valid or invalid) of the cache, a cache tag (address) 1005, and cache data 1006. In a typically adopted method, a low order address of a memory address is used as the entry number of the cache, and a high order address is used as the cache tag. In an on-chip cache, a cache tag 1005 and cache data 1006 are stored together as shown in FIG. 12. Therefore, it is possible to read simultaneously the cache tag 1005 and the cache data of each of the ways 1000 to 1003 of a pertinent entry, and immediately select data by using a way number subjected to cache hit.

If it is attempted to implement a set associative cache having a large capacity, however, it is necessary to separate an LSI having an interface with the cache data from an LSI having interfaces with the CPU bus and the cache tag. In this case, the cache tag and the cache data cannot be read at the same time. Therefore, the cache tag and the cache data are read out separately. If at this time the data width between the LSI having the interface with the cache tag and the LSI having the interface with the cache data is only approximately the CPU bus due to a physical restriction, then it takes a too long time to read out all cache data of a plurality of lines into the LSI of the CPU bus side. For example. in the case where the CPU bus width is 8 bytes and the line size is 32 bytes, it takes 4 cycles×4 ways=16 cycles to transfer lines corresponding to 4 ways from the cache data side LSI to the cache tag side LSI. This means that it takes 16 cycles whenever the cache is referred to. As a result, the performance is remarkably degraded. For preventing this performance degradation. it becomes necessary to read out cache data after a result of cache hit check is found. However, this causes an increase of access latency of the cache. Related art is disclosed in Japanese Patent Patent Application numbers JP-A-9-128346 and JP-A-5-225053, for example.

SUMMARY OF THE INVENTION

In the case where a large capacity cache of the set associative scheme or the like is provided between the CPU and the main memory as described above, it becomes necessary to put the cache tag portion and the cache data portion in separate LSIs and manage them under the restrictions of, for example, the number of pins of LSIs. In the case where such a configuration is adopted, there is a problem that the cache readout latency increases if the cache tag is read out and the cache hit check is conducted, and thereafter the cache data is read out.

An object of the present invention is to realize shortening of the cache data readout time in the case where the cache tag portion and the cache data portion are managed in separate LSIs as described above, in a computer system having a cache such as a n way set associative cache located in a class between the CPU and the main memory in hierarchy.

In order to achieve the above described object, in accordance with an aspect of the present invention, an advanced or speculative read request is issued to a controller of the cache data portion before conducting the cache hit check. Thus data supplied from the cache is read in advance and held in the controller. In the case where a cache hit has occurred, the read request based on the cache hit check is issued to the controller to read the data subjected to advanced speculative readout.

DESCRIPTION OF THE EMBODIMENTS

Hereafter, embodiments of the present invention will be described in detail by referring to drawing.

Figure 1:
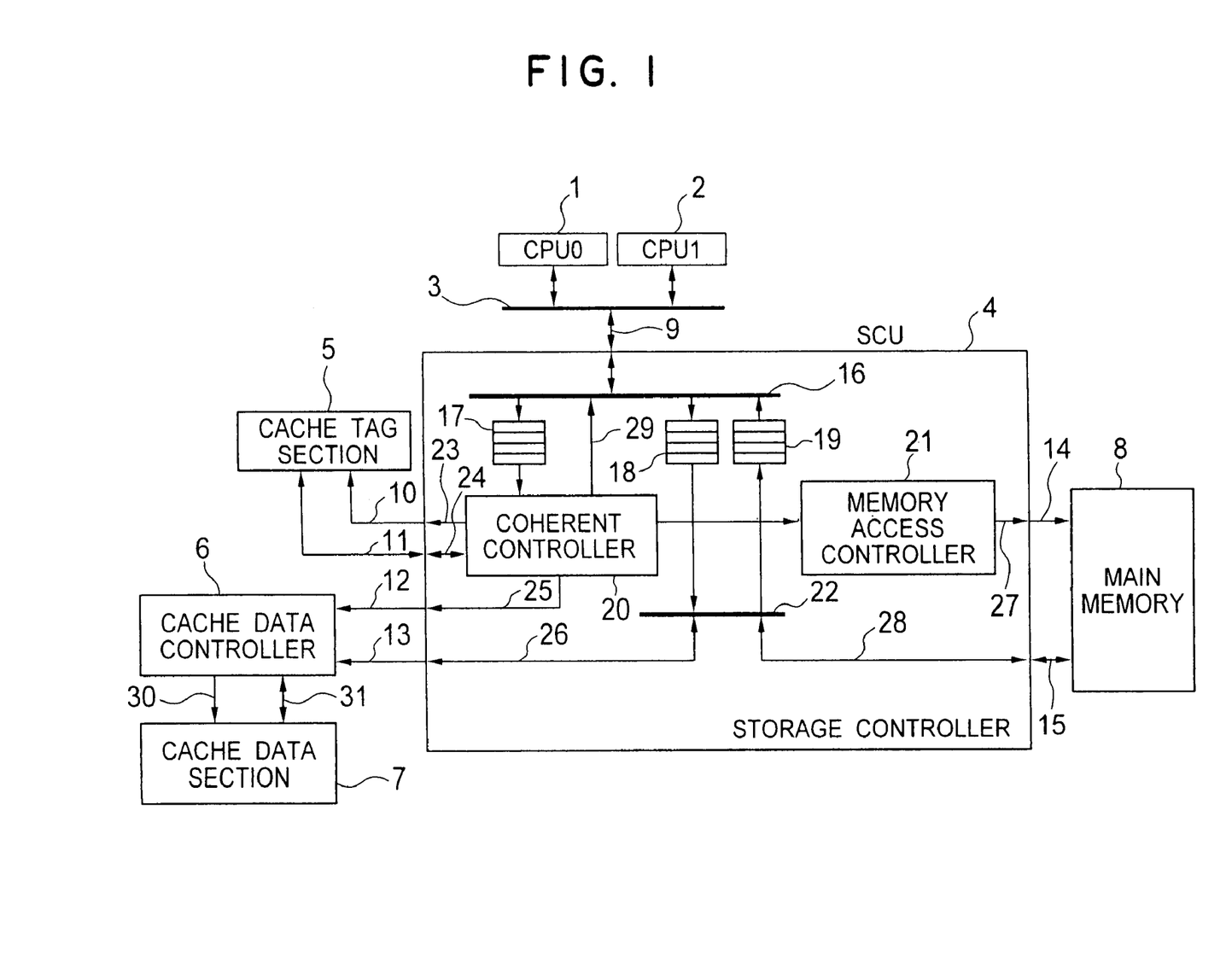
FIG. 1 is a block diagram showing a computer system of an embodiment of the present invention.

FIG. 1 shows a computer system of an embodiment of the present invention. The present system includes two CPUs, i.e., CPU(0) 1 and CPU(1) 2, a storage controller (SCU) 4, a cache tag section 5, a cache data controller 6, a cache data section 7, a main memory 8, and a bus 3 for connecting the CPU(0) 1, CPU(1) 2, and the SCU 4. Furthermore, the SCU 4 includes a bus 16, a memory access request queue 17, a write data buffer 18, a read response data buffer 19, a coherent controller 20, a memory access controller 21, a bus 22, and buses 23 to 29 for connecting them. Here, the number of CPUs (i.e., the number of nodes) is two. As a matter of course, however, the number of nodes may be two or more, or the number may be one.

Although not illustrated, it is assumed that each of CPU (0) 1 and CPU(1) 2 has a built-in cache. Furthermore, it is assumed that each of cache tag section 5 and the cache data section 7 includes an SHAM which is a high speed memory device. It is assumed that the main memory 8 includes a DRAM which is a low speed memory device. Furthermore, it is assumed that the cache of the present system formed of the cache tag section 5 and the cache data section 7 is a 4-way set associative cache.

Figure 2:
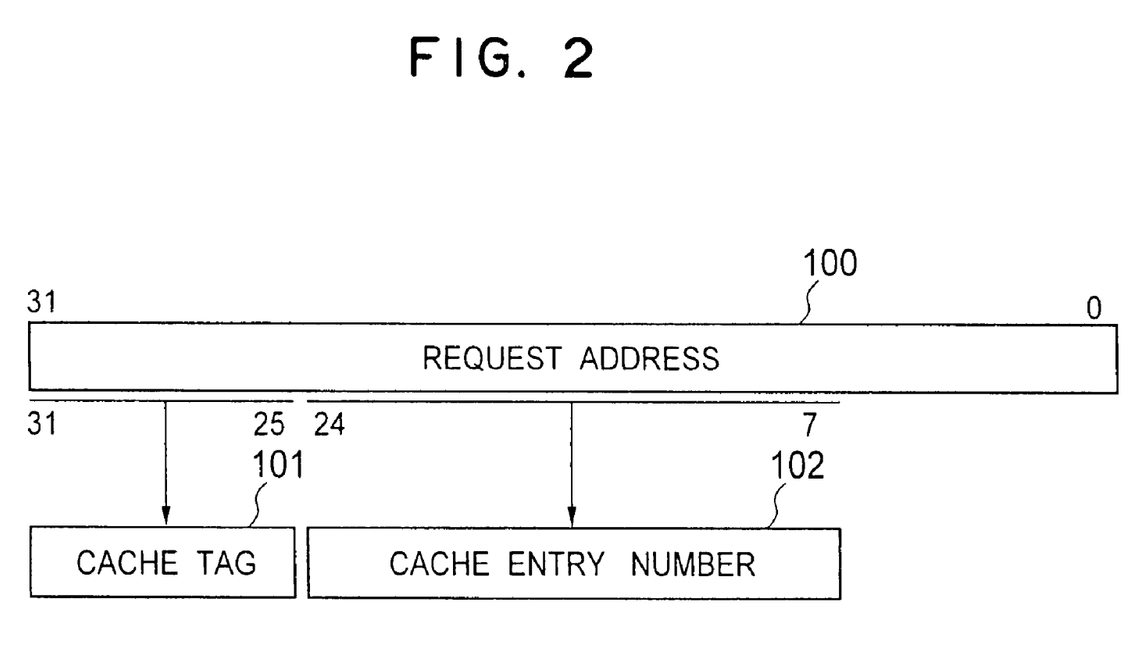
FIG. 2 is a diagram showing relations among an address supplied from a CPU, a cache tag, and a cache entry number.

FIG. 2 shows relations among a request address supplied from the CPU(0) 1 and CPU(1) 2, a cache tag, and a cache entry number. In the present embodiment, it is assumed that the request address supplied from the CPU(0) 1 and CPU(1) 2 has 32 bits and the number of cache entries is 256 K entries. Furthermore, it is assumed that the cache line size is 32 bytes. In FIG. 2, numeral 100 denotes the request address (ADR <31:0>) output from S the CPU(0) 1 and CPU(1) 2. Since the cache line size is 32 bytes, six low-order bits of the ADR 100 indicate an address in the cache line. Since the number of cache entries is 256 K, 18 bits of ADR <24:7> become a cache entry number 102. ADR <31:25> which is the remaining high-order address becomes a cache tag 101.

Figure 3:
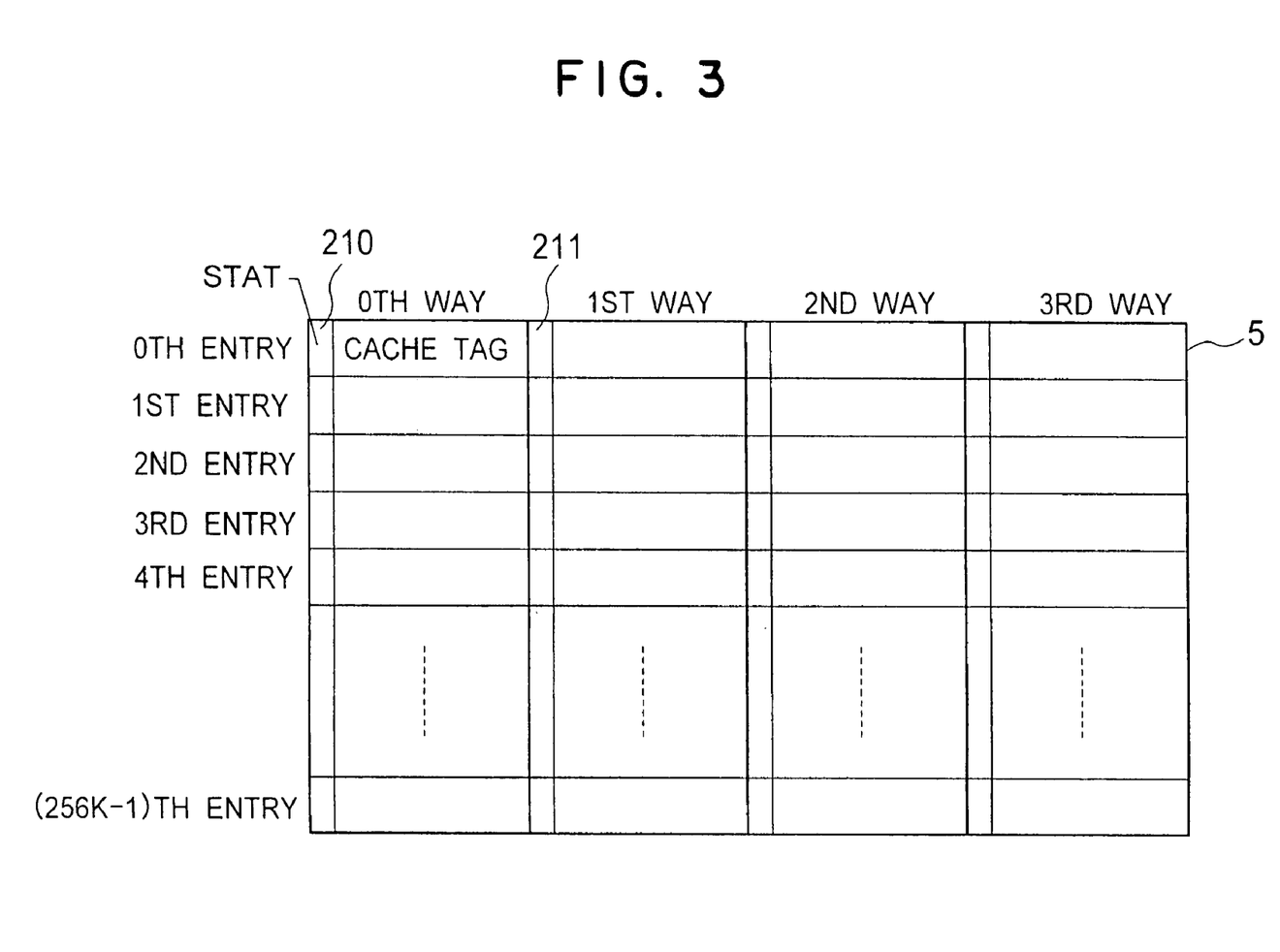
FIG. 3 is a diagram showing a configuration example of a cache tag section.
Figure 4:
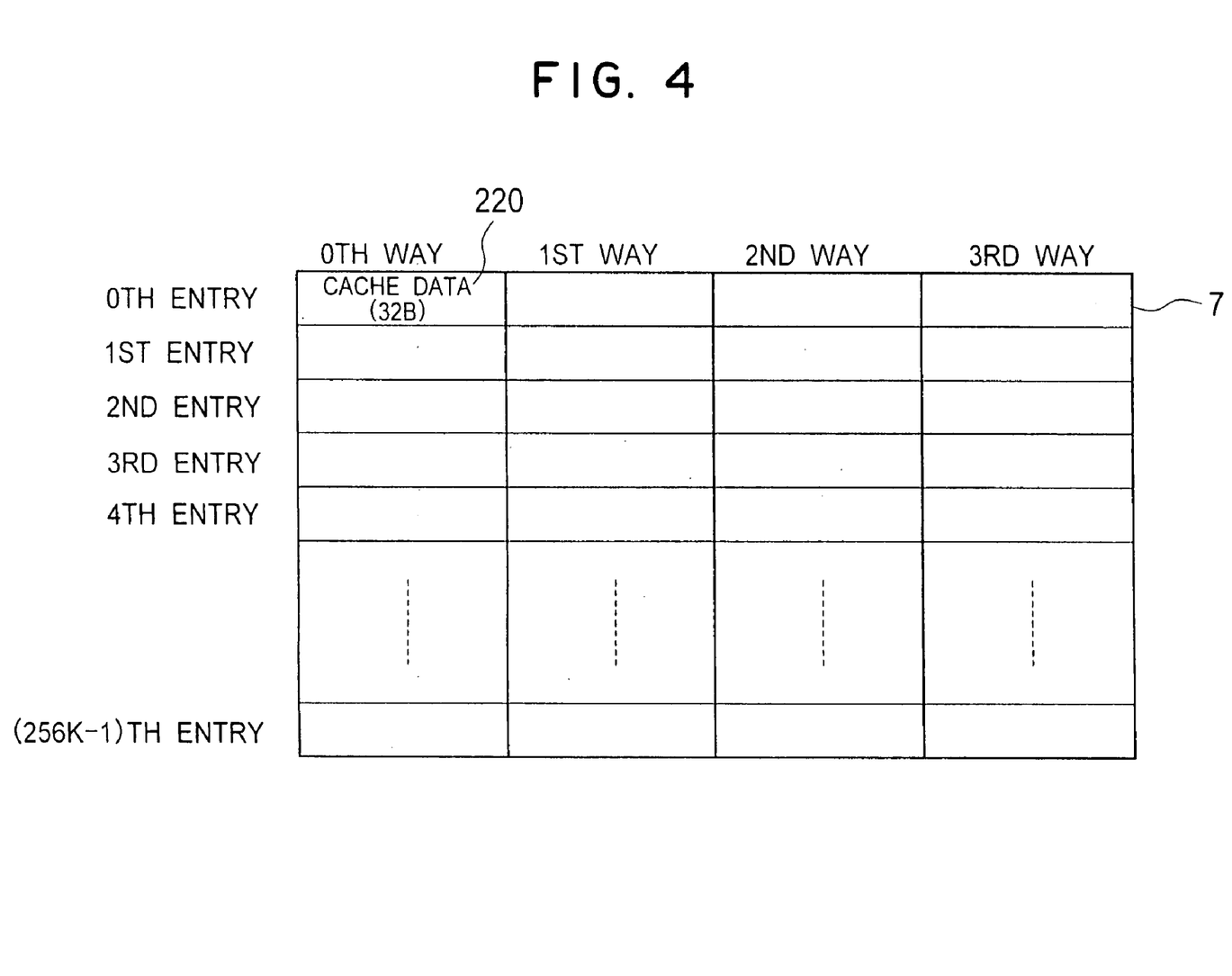
FIG. 4 is a diagram showing a configuration example of a cache data section.

FIGS. 3 and 4 show configuration examples of the cache tag section 5 and the cache data section 7. As shown in FIG. 3, the cache tag section 5 is a 256 K entry. 4-way aggregate of cache states (STATs) 210 and cache tags 211. Furthermore, as shown in FIG. 4, the cache data section 7 is a 256 K entry, 4-way aggregate of cache data 220. There is a one-to-one correspondence between entries and ways of the cache tag section 5 and the cache data section 7. For example, a cache tag corresponding to cache data stored in a block of a 0th entry and a 0th way of the cache data section 7 is stored in a block of a 0th entry and a 0th way of the cache tag section 5. The cache state (STAT) 210 indicates whether cache data (cache line) of the pertinent block is valid or invalid.

Returning back to FIG. 1, cache data controller 6 accepts a cache data read/write request issued by the SCU 4, and reads/writes cache data to/from the cache data section 7. A path 12 is a path for sending an access request fed from the SCU 4 to the cache data controller 6. A path 13 is a path for exchanging data between the SCU 4 and the cache data controller 6. A path 30 is a signal line to be used by the cache data controller 6 to conduct read/write control on the cache data section 7. A path 31 is a path for exchanging data between the cache data controller 6 and the cache data section 7. In the present embodiment, the number of signals of the paths 30 and 31 is large because of the 4-way set associative cache. Therefore, it is physically impossible to provide pins in the SCU 4 directly for the cache data section 7. Accordingly, the cache data controller 6 is formed as a chip separate from the chip of the SCU 4. As a result, the paths 12 and 13 are smaller than the paths 30 and 31 in the number of signals. The memory access request queue 17 in the SCU 4 is a queue for buffering memory access requests issued by the CPU(0) 1 and CPU(1) 2 and sending a memory access request to the coherent controller 20 if the coherent controller 20 is not busy. The data buffer 18 is a buffer for temporarily storing write data supplied from the CPU(0) 1 and CPU(1) 2. The data buffer 19 is a buffer for temporarily storing read response data to be returned to the CPU(0) 1 and CPU(1) 2. The coherent controller 20 determines whether a memory access request issued by the CPU(0) 1 and CPU(1) 2 conducts a cache hit, and issues an access request to the cache data controller 6 or the memory access controller 21.

The memory access controller 21 effects access control of the main memory 8 in accordance with the access request issued by the coherent controller 20.

The coherent controller 20 resolves the request address 100 supplied from the CPU(0) 1 and CPU(1) 2 as shown in FIG. 2, reads out cache tags 211 from each way of a pertinent entry of the cache tag section 5 shown in FIG. 3 by using the cache entry number 102, compares them with the cache tag 101 of the request address 100, and thereby conducts cache hit check. This cache hit check itself is basically the same as that of the conventional technique.

Operation of an embodiment in the computer system of FIG. 1 will now be described. In the case where data required for execution of an instruction is not stored in the built-in cache, the CPU(0) 1 or CPU(1) 2 issues a memory access request to the SCU 4 via the bus 3. In the SCU 4, the memory access request is stored in the memory access request queue 17 via the bus 16. In the case of a write request, data is also sent from the CPU(0) 1 or CPU(1) 2. In the SCU 4, therefore, write data is stored in the data buffer 18 via the bus 16. If the coherent controller 20 is not busy, a memory access request is sent from the memory access request queue 17 to the coherent controller 20.

By referring to the cache tag section 5, the coherent controller 20 determines whether the received memory access request hits the cache. However, if, in the case of a read request, data is read out from the cache data 7 via the cache data controller based on a result of the cache hit decision, the access latency becomes large. Then, before conducting a cache hit decision by referring to the cache tag section 5, the coherent controller 20 issues a request for conducting advanced or speculative readout to the cache data controller 6 (when the readout request is received from the processor bus). The speculative (SP) readout request may be formatted to include an address area, a read/write ID area and as SP bit area indicating whether the request is speculative. Otherwise the request may be formatted by only an entry address, if it is speculative. Thus, the coherent controller 20 reads out data which should be read out when a hit has occurred, from the cache data section 7 into the cache data controller 6 in advance. When a hit has occurred, the coherent controller 20 uses this data read in advance.

Figure 5:
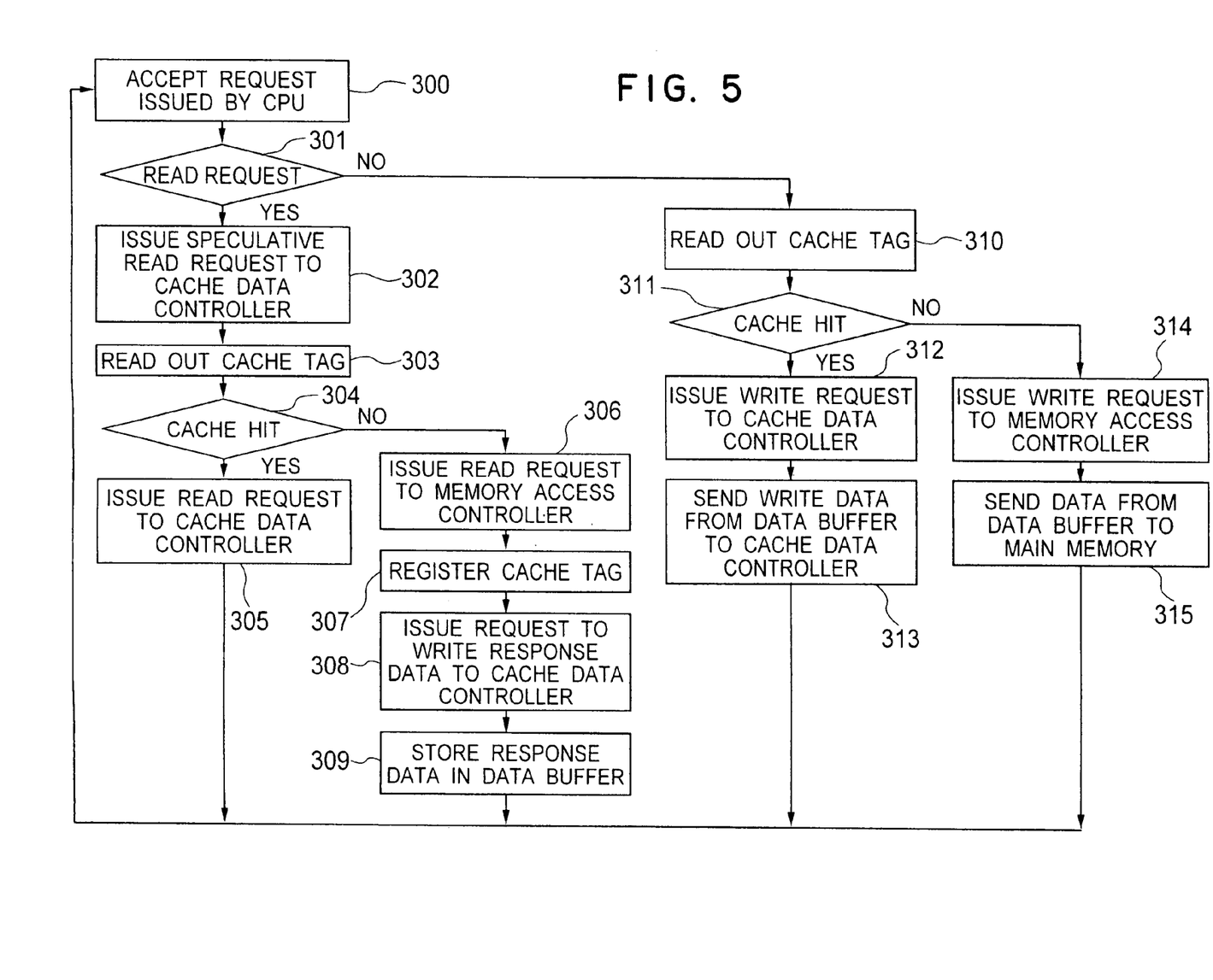
FIG. 5 is a processing flow diagram of a coherent controller according to the first embodiment of the present invention.

FIG. 5 is a processing flow of an embodiment of 20 the coherent controller 20. Hereafter, detailed operation of the coherent controller 20 will be described by referring to FIG. 5.

Upon accepting a memory access request from the CPU (0) 1 or CPU(1) 2 (step 300), the coherent controller 20 determines whether the request is a read request (step 301). If the request is a read request, the coherent controller 20 issues an advanced or speculative read request to the cache data controller 6 via the paths and 12 (step 302). At the same time, the coherent controller 20 sends a cache entry number of the pertinent read request to the cache tag section 5 via the path 23 and a path 10, and reads out cache tags corresponding to 4 ways of the pertinent entry from the cache tag section 5 via a path 11 and the path 24 (step 303). The coherent controller 20 determines whether the cache tags read out from the cache tag section 5 hit the cache tag of the read request (step 304). When a hit has occurred, the coherent controller 20 issues a read request to the cache data controller 5 via the paths 25 and 12 (step 305). The read request at this time includes a way number for which the hit has occurred, along with a cache entry number. In the case where a cache miss has occurred, the coherent controller 20 issues a read request to the memory access controller 21 (step 306), and newly registers a cache tag of the pertinent memory access request in a desired way of the pertinent entry of the cache tag section 5 via the paths 23 and 10 (step 307).

The memory access controller 21 accesses the main memory 8 via the path 27 and a path 14, and reads out data onto a path and the path 28. If response data is returned from the main memory 8, the coherent controller 20 issues a write request to the cache data controller 6 in order to register this response data with the cache data section 7, and sends the response data to the cache data controller 6 via the bus 22 and the paths 26 and 13 as write data (step 108). At the same time, the coherent controller 20 stores the response data in the data buffer 19 from the bus 22 in order to send the response data to the CPU (step 309).

If the request received from the CPU(0) 1 or CPU(1) 2 is a write request, then the coherent controller 20 reads out cache tags corresponding to 4 ways of the pertinent entry from the cache tag section 5 in the same way as determines 311). If there has occurred a cache hit, the coherent controller 20 issues a write request to the cache data controller 6 via the paths 25 and 12 (step 312). At the same time, the coherent controller 20 sends write data to the cache data controller 6 via the paths 26 and 13 (step 313). The write request at this time includes a way number for which the hit has occurred, along with a cache entry number. In the case where a cache miss has occurred, the coherent controller 20 issues a write request to the memory access controller 21 (step (step 314). At the same time, the coherent controller 20 sends write data to the main memory 8 via the paths 28 and 15 (step 315). The memory access controller 21 accesses the main memory 8 via the paths 27 and 14, and writes the data into the main memory 8.

Especially in the case where a read request has been accepted, the coherent controller 20 thus has a function of issuing an advanced or speculative read request to the cache data controller 6 before conducting a cache hit check by using the cache tag section 5. In the case of a write request, the operation is basically the same as the operation of the conventional technique.

The configuration and operation of the cache data controller 6 will now be described. With reference to FIG. 1 the cache data controller 6 exchanges data with the cache data section 7 in accordance with an advanced or speculative read request, a read request, and a write request supplied from the coherent controller 20 via the path 12.

Figure 6:
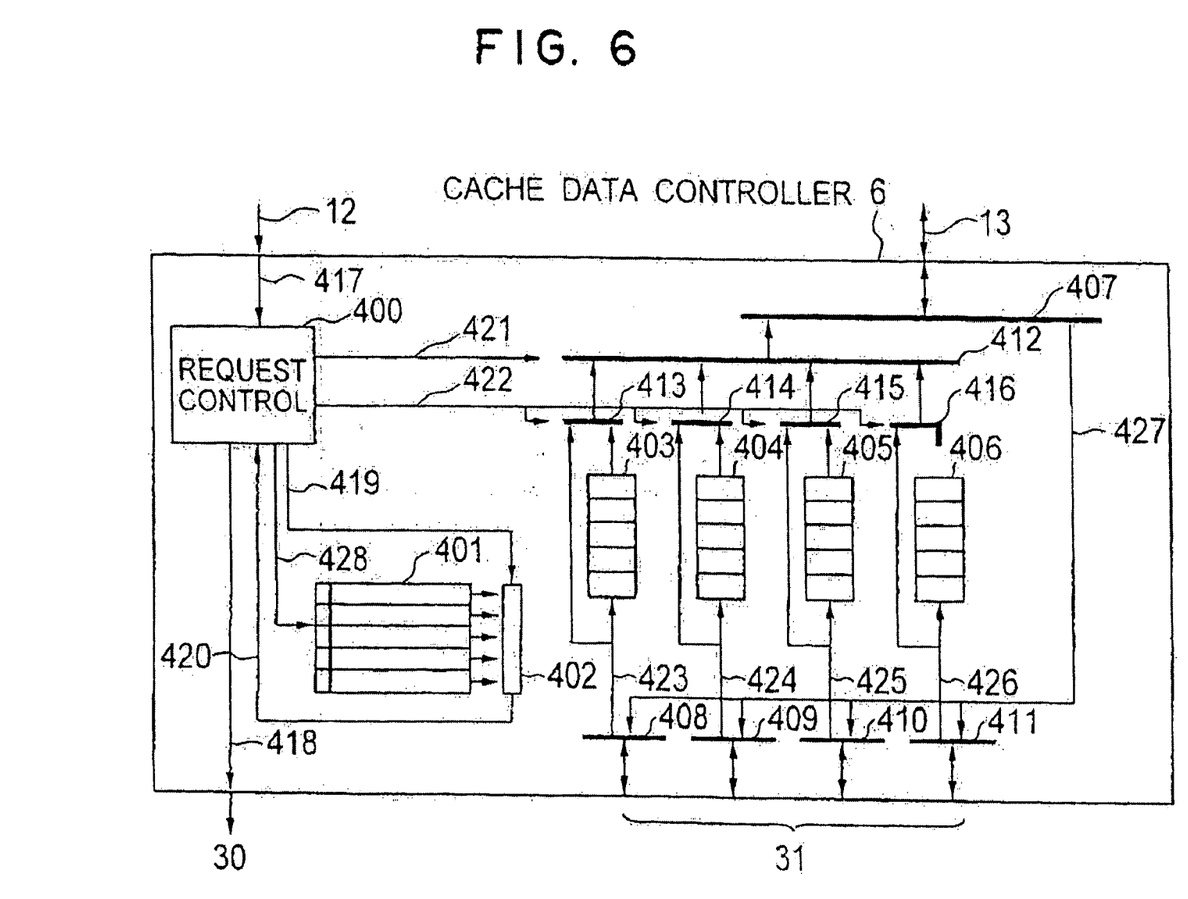
FIG. 6 is a detailed block diagram of a cache data controller.

FIG. 6 is a detailed block diagram of the cache data controller 6. The cache data controller 6 includes a request controller 400, a speculative read request buffer 401, an address comparator section 402, speculative read data buffers 403 to 406, buses 407 and 408 to 411, selectors 412 and 413 to 416, and paths 417 to 428.

The request controller 400 decodes a request received from the coherent controller 20 via the path 12, determines processing to be conducted in the cache data controller 6 on the basis of a kind of the accepted request, and controls respective components. The speculative read request buffer 401 is a buffer for holding a speculative read request received from the coherent controller 20. The speculative read data buffers 403 to 406 are buffers for holding data read out from the cache data section 7 in accordance with a speculative read request. As shown in FIG. 4, the cache data section 7 of the present embodiment is 4-way set associative. Data of the 0th way are stored in the speculative read data buffer 403. Data of the first way are stored in the speculative read data buffer 404. Data of the second way are stored in the speculative read data buffer 405. Data of the third way are stored in the speculative read data buffer 406. The address comparator section 402 determines whether an advanced or speculative read request, a read request, or a write request has the same cache entry as a request stored in the speculative read request buffer 401. See FIGS. 2 and 3.

Figure 7:
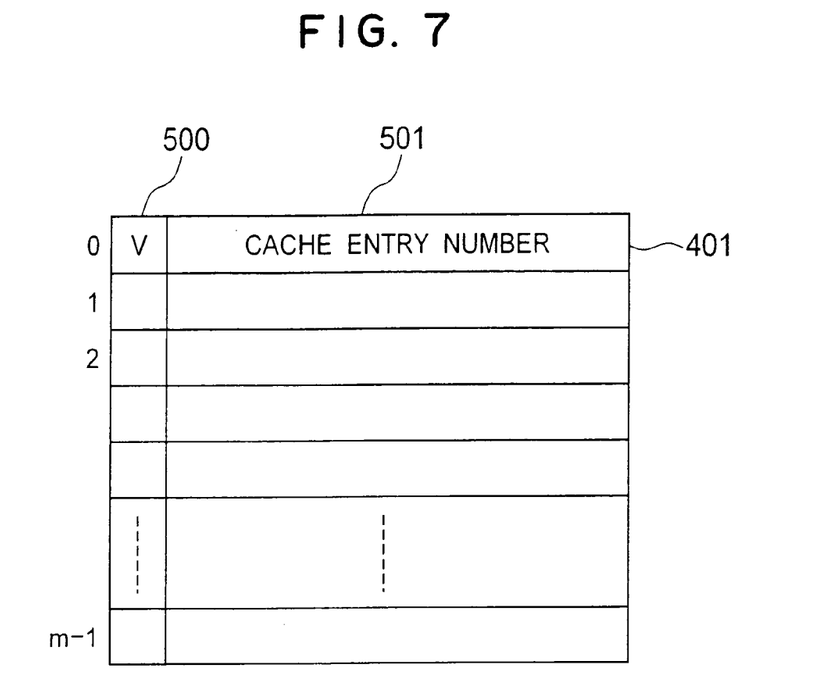
FIG. 7 is a diagram showing a configuration example of a speculative read request buffer in the cache data controller.
Figure 8:
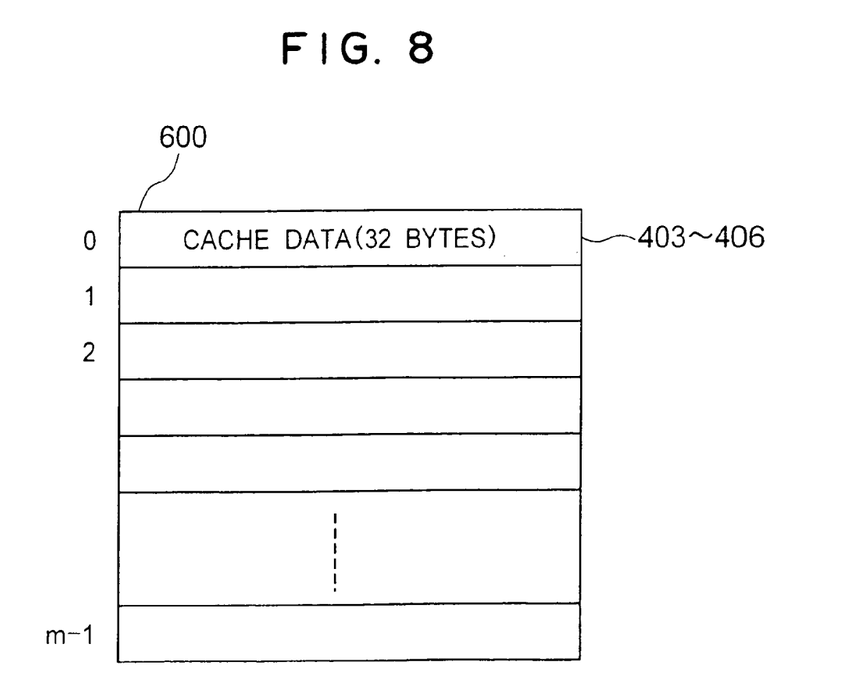
FIG. 8 is a diagram showing a speculative read data buffer in the cache data controller.

FIGS. 7 and 8 show configuration examples of the speculative read request buffer 401 and the speculative read data buffers 403 to 406. As shown in FIG. 7, the speculative read request buffer 401 includes a plurality of entries. Each entry includes a valid bit (V) 500 and a cache entry number 501. The valid bit 500 is a bit indicating that the entry is valid or invalid. The cache entry number 501 is a cache entry number which is the subject of a speculative read request stored in the pertinent entry. As shown in FIG. 8, each of the speculative read data buffers 403 to 406 also includes a plurality of entries. Cache data (32 bytes) 600 read out from the cache data section 7 speculatively by a speculative read request is stored in each entry.

There is one-to-one correspondence between entries of the speculative read request buffer 401 and entries of the speculative read data buffers 403 to 406.

For example, if it is assumed that a cache entry number of a certain speculative read request is stored in the 0th entry of the speculative read request buffer 401, cache data corresponding to 4 ways read out from the cache data section 7 speculatively by the speculative read request are stored in the 0th entry of the speculative read data buffers 403 to 406. The number m of entries of the speculative read request buffer 401 and the speculative read data buffers 403 to 406 may be an arbitrary number. Furthermore, the buffers 401 and 403 to 406 may be formed as one body.

Figure 9:
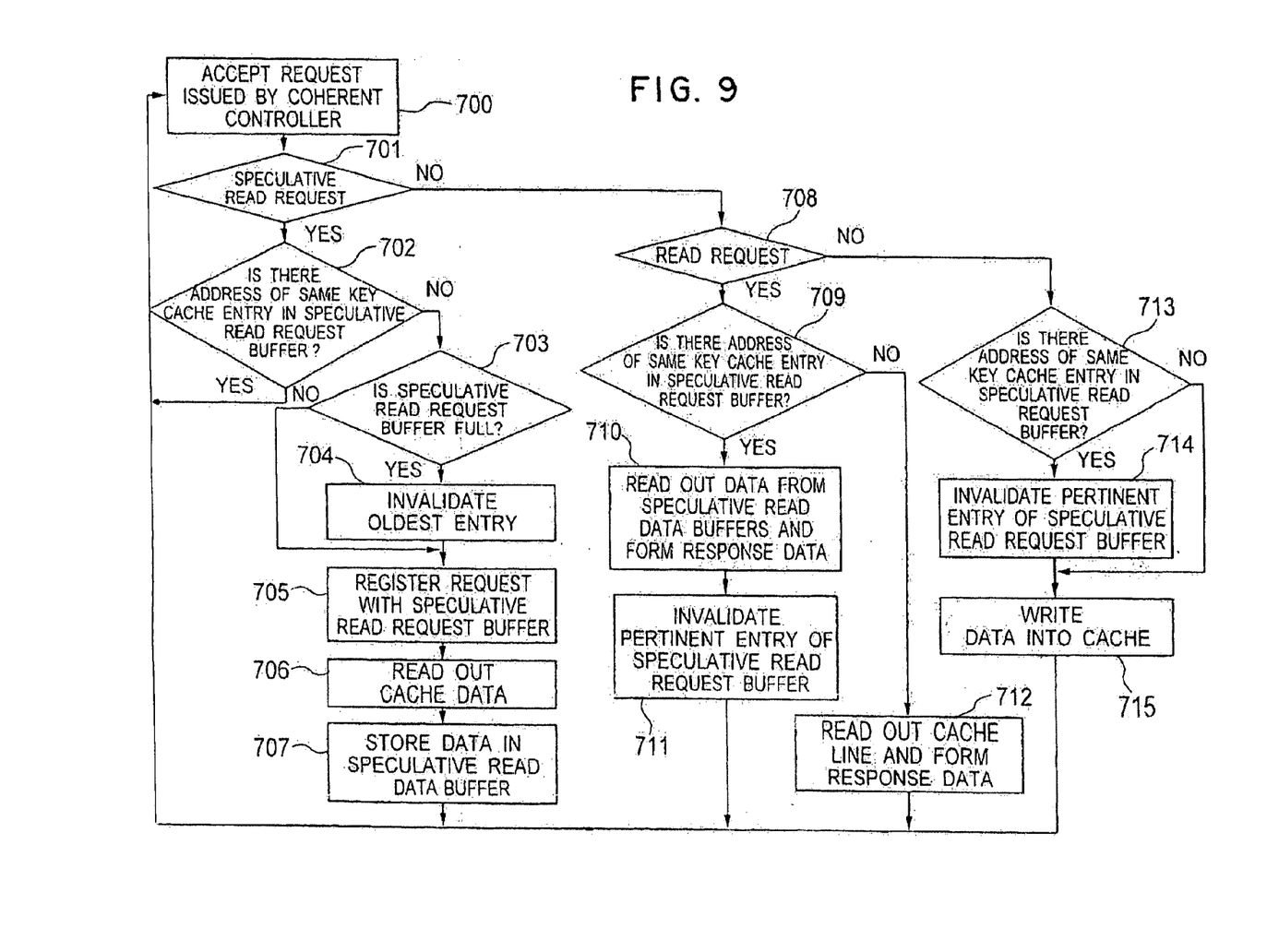
FIG. 9 is a processing flow diagram of a request controller in the cache data controller according to the first embodiment of the present invention.

FIG. 9 is a processing flow of the request controller 400 in an embodiment. Hereafter, detailed operation of the cache data controller 6 will be described centering around the request controller 400 by referring to FIG. 9.

Upon receiving a request from the coherent controller 20 via the paths 12 and 417 (step 700), the request controller 400 first determines whether the request is a speculative read request (step 701). If the request is a speculative read request, then the request controller 400 determines whether a request to the same cache entry is stored in the speculative read request buffer 401 beforehand (step 702). To be concrete, the request controller 400 outputs the cache entry number of the speculative read request to the path 419. In addition, the request controller 400 reads out cache entry numbers of respective entries of the speculative read request buffer 401, makes the address comparator section compare the cache entry number of the speculative read request with the cache entry numbers of respective entries, receives results of the comparison via the path 420, and thereby determines whether the same cache entry as that of the speculative read request is stored in the speculative read request buffer 401 beforehand. If the same cache entry is stored, the newly received speculative read request is discarded. If a request to the same cache entry is not stored in the speculative read request buffer 401, then the request controller 400 determines whether the speculative read request buffer 401 is full (step 703). If the speculative read request buffer 401 is not full, then the request controller 400 registers a new speculative read request with an empty entry in the speculative read request buffer 401 via the path 428 (step 705). If the speculative read request buffer 401 is full, then the request controller 400 invalidates the oldest entry in the speculative read request buffer 401 (step 704), and thereafter registers a new request. By the way, such an invalidation algorithm is well known as a LRU (Least Recently Used) method. Detailed description thereof will be omitted. The registered speculative read request is transferred to the cache data section 7 via the paths 418 and 30 as a read request. Cache data corresponding to 4 ways are read out from the pertinent cache entry of the cache data section 7 (step 706). The cache data are newly stored in an entry of the speculative read data buffers 403 to 406, corresponding to the entry in the speculative read request buffer 401 with which the speculative read request has been registered via the path 31, the buses 408 to 411, and the paths 423 to 426 (step 707). As a result, in the case where the speculative read request buffer 401 is full, new cache data is overwritten and stored in the pertinent entry of the speculative read data buffers 403 to 406, corresponding to the invalid entry in the speculative read request buffer 401.

If the request received from the coherent controller 20 is not a speculative read request, but a read request (step 708), then the request controller 400 checks whether an address (cache entry number) of the same cache entry as that of the read request is stored in the speculative read request buffer 401 beforehand (step 709). How to check is the same as that in the case of the speculative read request. If there is the same cache entry, then the request controller 400 reads out data from the pertinent entry of the speculative read data buffers 403 to 406, and sends the data to the path 13 via the selectors 413 to 416, the selector 412, and the bus 407 as response data (step 710). In other words, the request controller 400 outputs a selection signal of the speculative read request buffer side on the path 422, and outputs a hit way number included in the read request to the path 421 as a selection signal. As a result, data corresponding to 4 ways read out from the pertinent entry of the speculative read data buffers 403 to 406 are first selected by the selectors 413 to 416. Subsequently, data corresponding to the hit way number in the pertinent 4 ways is selected by the selector 412, and sent to the path 13 via the bus 407 as response data. Thereafter, the pertinent entry of the speculative read request buffer 401 is invalidated (step 711). If there is not an address of the same cache entry as that of the read request in the speculative read request buffer 401, then the request controller 400 transfers the pertinent read request to the cache data section 7 via the paths 418 and 30, selects cache data corresponding to 4 ways read out from the pertinent cache entry of the cache data section 7 by using the selectors 413 to 416 via the buses 408 to 411, selects data corresponding to the hit way number included in the cache data by using the selector 412, and sends out the selected data from the bus 407 to the path 13 as response data (step 712).

This case occurs when the data read from the cache data section 7 into the speculative read data buffers 403 to 406 in advance by the speculative read request is invalidated by a write request (preceding write request) hereafter described before a subsequent corresponding read request.

In the case whether the request received from the coherent controller 20 via the paths 12 and 417 is neither a speculative read request nor a read request, i.e., also in the case where the request is a write request, the request controller 400 determines whether an address to the same cache entry is stored in the speculative read request buffer 401 beforehand (step 713). If the address is present, the request controller 400 invalidates the pertinent entry of the speculative read request buffer 401 (step 714). Subsequently, the request controller 400 sends out a write request to the cache data section 7 via the paths 418 and 30. At the same time, the request controller 400 sends out cache data received from the coherent controller 20 via the path 13 to the path 31 via the bus 407, the path 427, and the buses 408 to 411, and writes the data into a specified way number of a specified entry of the cache data section 7 (step 715).

In the case where a request to the same entry as the write request received from the coherent controller 20 is present in the speculative read request buffer 401, the pertinent entry is invalidated at the step 714 in FIG. 9. The reason why doing so is that otherwise the data in the cache data section 7 is rewritten by the write operation and noncoincidence with data in the speculative read data buffers 403 to 406 occurs. By virtue of the invalidation processing of the step 714, rewritten new data is read out from the cache data section 7 at step 712 in a subsequent read request for the same cache entry.

In the case where a read request received from the coherent controller 20 is a request to the same entry as a request in the speculative read request buffer 401, the cache data controller 6 selectively returns data read in advance and stored in the speculative read data buffers 403 to 406, instead of data supplied from the cache data section 7, in the present embodiment as shown in FIG. 9. As a result, access latency of the cache data section 7 can be reduced. If the coherent controller 20 issues a speculative read request while conducting the cache hit check as shown in FIG. 5, therefore, it becomes possible to reduce cycles corresponding to the cache hit check time from the memory access latency.

Figure 10:
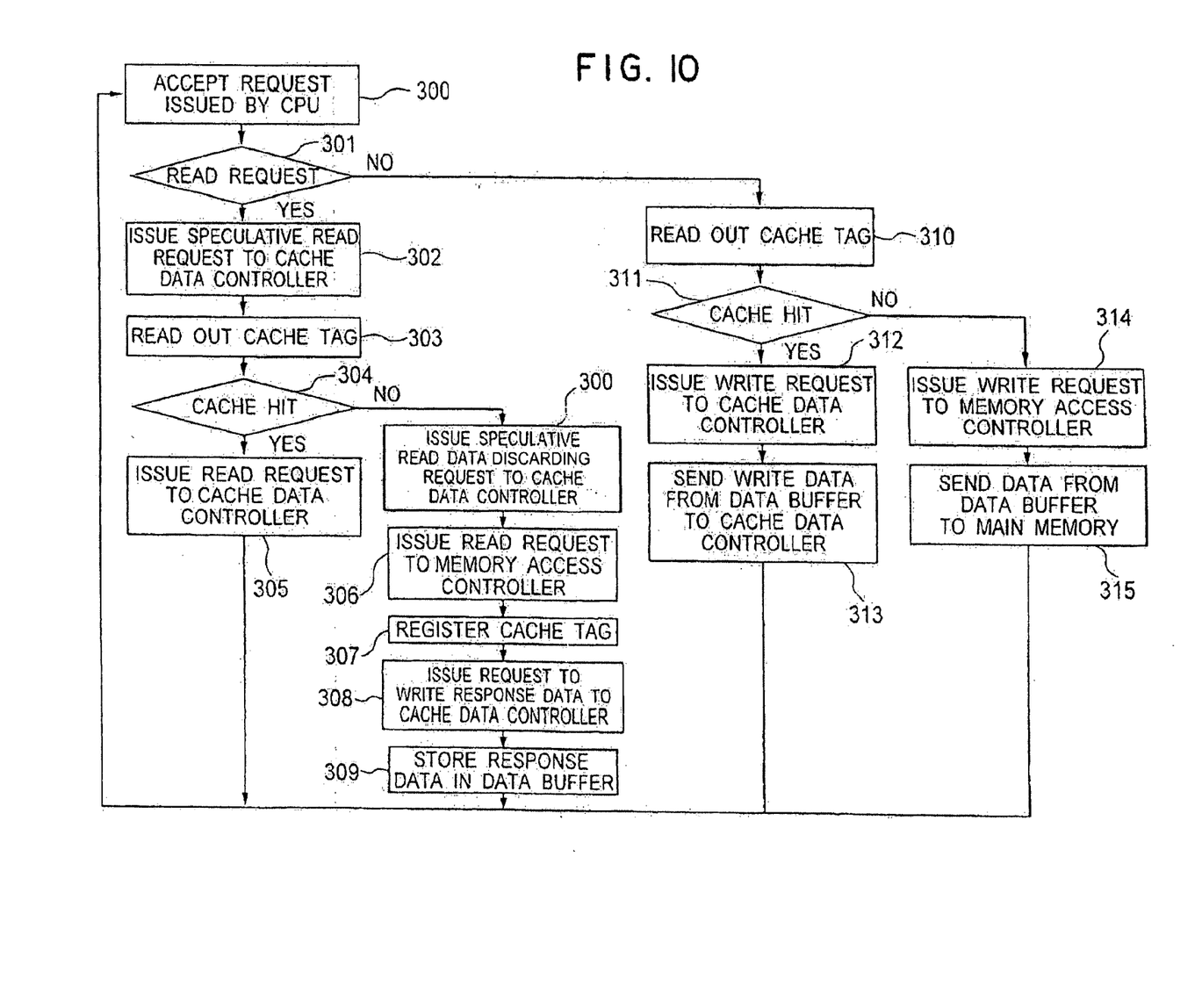
FIG. 10 is a processing flow diagram of a coherent controller according to a second embodiment of the present invention.
Figure 11:
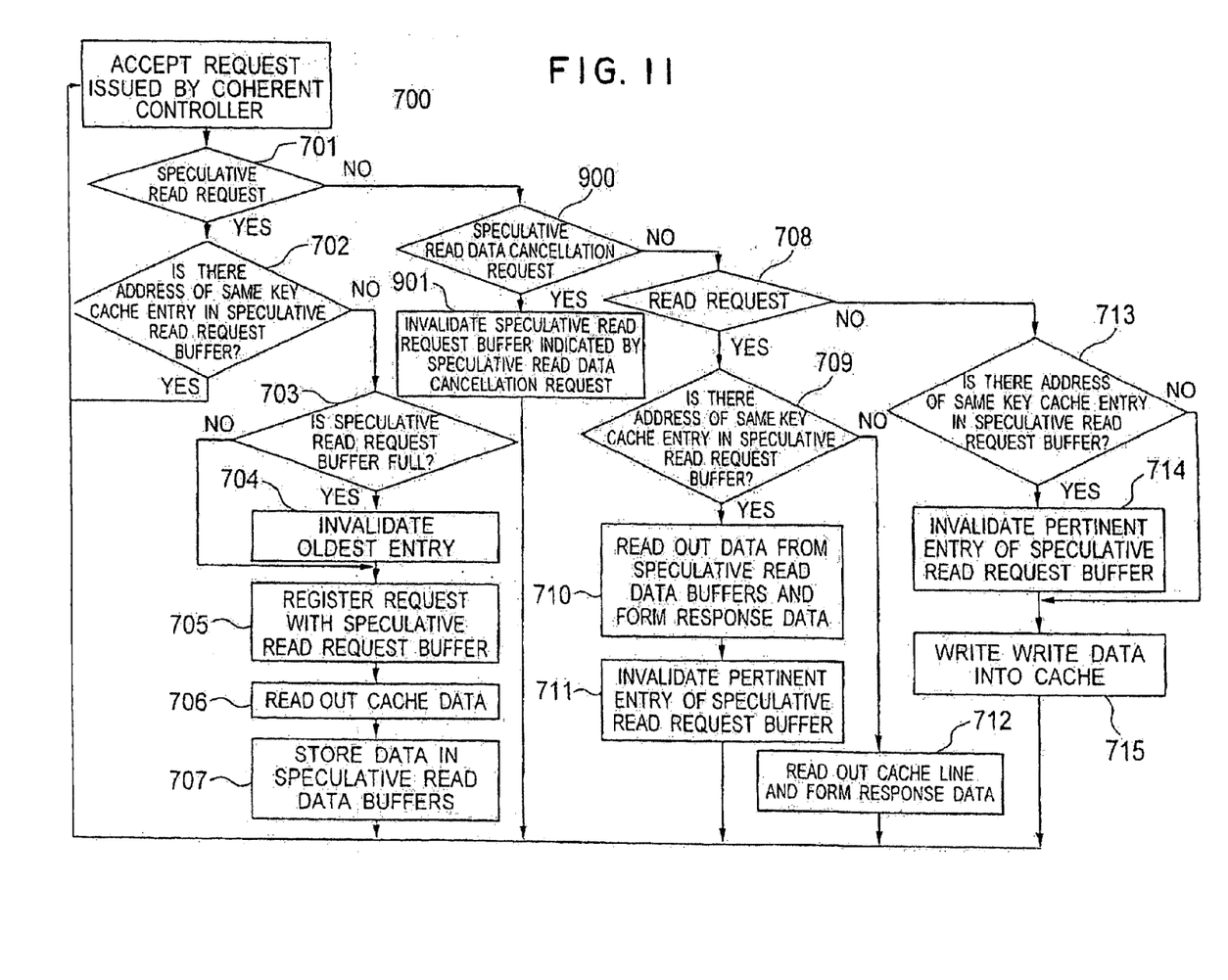
FIG. 11 is a processing flow diagram of a request controller in a cache data controller according to a second embodiment of the present invention.

FIGS. 10 and 11 show processing flows of the coherent controller and the request controller 400 in the cache data controller 6 in another embodiment of the present invention.

FIG. 10 is the processing flow of the coherent controller 20. FIG. 10 is different from FIG. 5 in that a step 800 has been added. In the case where the speculative read request issued to the cache data controller 6 at the step 302 results in a cache miss, a request (speculative read data discarding request) for invalidating the speculative read data read in advance by the pertinent speculative read request is issued to the cache data controller 6 at the step 800. As a result, the cache data controller 6 can invalidate unused speculative read data stored in the speculative read data buffers 403 to 406. Accordingly, effective use of the speculative read request buffer 401 and the speculative read data buffers 403 to 406 becomes possible.

FIG. 11 is a processing flow of the request controller 400 included in the cache data controller 6. FIG. 11 is different from FIG. 9 in that steps 900 and 901 have been added. The steps 900 and 901 are a processing flow conducted in the case where a speculative read cancellation request has been accepted from the coherent controller 20. In other words, upon receiving a speculative read data discarding request from the coherent controller 20 (step 900), the request controller 400 invalidates an entry in the speculative read request buffer 401 in which a cache entry number of a speculative read request corresponding to the pertinent speculative read data discarding request has been registered (step 901). As a result, effective use of the speculative read request buffer 401 and the speculative read data buffers 403 to 406 becomes possible. If each of the buffers 401 and 403 to 406 is formed with a margin of a certain degree in the number of entries, it becomes possible to eliminate the full state and it also becomes possible to make the full control itself of the steps 703 and 704 unnecessary.

In the case where a read request received from the coherent controller 20 is a request to the same entry as a request in the speculative read request buffer 401, the cache data controller 6 reads out data from some of the speculative read data buffers 403 to 406, instead of data supplied from the cache data section 7, in the present embodiment as well in the same way as the above described first embodiment. As a result, access latency of the cache data section 7 can be reduced. If the coherent controller 20 issues a speculative read request while conducting the cache hit check, therefore, it becomes possible to reduce cycles corresponding to the cache hit check time from the memory access latency.

Heretofore, in the embodiments of the present invention, it has been assumed that the cache is a 4 way set associative. However, the number of ways may be an arbitrary number of at least one. Furthermore, it is a matter of course that the present invention is not limited to a set associative cache, but the present invention can be widely applied to a computer system using such a cache scheme that the cache tag portion and the cache data portion are managed in separate LSIs.

What is claimed is:

1. A computer system including a CPU, a memory, and a cache located in a hierarchy class between said CPU and said memory, said computer system comprising:
    a coherent controller for determining whether a request supplied from said CPU hits said cache to thereby issue a request to said cache or said memory; and
    a cache data controller for controlling reading or writing of data registered in said cache, in accordance with a request issued by said coherent controller;
    wherein upon accepting a read request from said CPU, said coherent controller conducts hit decision of said cache, issues an advanced speculative read request to said cache data controller before a result of the hit decision is indicated, and issues a read request to said cache data controller if the hit decision is a cache hit, and
    wherein said cache data controller comprises:
    means, responsive to acceptance of an advanced speculative read request issued by said coherent controller, for reading data from said cache and holding the data, and
    means responsive to acceptance of a read request and a cache hit decision for sending said held speculative read data to said CPU as response data.

2. A computer system according to claim 1, wherein if a hit decision is a cache miss, said coherent controller issues a speculative read data discarding request to said cache data controller, and
    wherein upon accepting a speculative read data discarding request issued by said coherent controller, said cache data controller discards speculative read data of a speculative read request corresponding to the speculative read data discarding request.

3. A computer system according to claim 1, wherein said cache is an n-way associative cache.

4. A computer system according to claim 3, wherein said cache data controller accepts an advanced speculative read request corresponding to n ways issued by said coherent controller, reads out data corresponding to n ways from said cache, and hold the data.

5. A cache data control method in a computer system including a CPU, a memory, and a cache located in a hierarchy class between said CPU and said memory, said cache data control method comprising the steps of:
    receiving a request from said CPU;
    determining whether said request is an advanced speculative data request;
    if said request is a speculative read request,
    determining whether a request to the same cache entry as said advanced speculative read request is stored in a speculative read request buffer beforehand; and
    if the request is stored in a speculative read request buffer beforehand, disregarding the advanced speculative read request received from said CPU.

6. A cache data control method according to claim 5, wherein if, as a result of determining whether a request to the same cache entry as said advanced speculative read request is stored in a speculative read request buffer beforehand, said advanced speculative read request is not stored in said speculative read request buffer, said method further comprises the steps of:
 determining whether said speculative read request buffer is full;
 if said speculative read request buffer is not full, registering said advanced speculative read request with an empty entry in said speculative data request buffer;
 if said speculative read request buffer is full, invalidating an oldest entry included in said speculative read request buffer; and
 registering said advanced speculative read request with said speculative read request buffer.

7. A cache data control method according to claim 5, wherein if, as a result of determining whether said request received from said CPU is an advanced speculative read request, said request is not an advanced speculative read request, but a read request, said method further comprises the steps of:
 determining whether an address of the same cache entry as said read request is stored in said speculative read request buffer;
 if the address of the same cache entry as said advanced read request is stored in said speculative read request buffer, reading out data from a pertinent entry of said speculative read request buffer; and
 transmitting said data as response data.

8. A cache data control method according to claim 7, wherein if, as a result of determining whether an address of the same cache entry as said read request is stored in said speculative read request buffer, the address is not stored, said method further comprises the steps of:
 transferring said read request to said cache;
 selecting cache data read out from a pertinent cache entry of said cache; and
 transmitting said cache data as response data.

9. A cache data control method according to claim 5, wherein if, as a result of determining whether said request received from said CPU is an advanced speculative read request, said request is not an advanced speculative read request, but a write request, said method further comprises the steps of:
 determining whether an address of the same cache entry as said write request is stored in said speculative read request buffer;
 if the address of the same cache entry as said write request is stored in said speculative read request buffer, invalidating a pertinent entry of said speculative request buffer;
 transmitting said write request to a data section of said cache; and
 writes said write request into a specified entry of said cache data section.

10. A cache data control method in a computer system including a CPU, a memory, and a cache located in a hierarchy class between said CPU and said memory, said cache data control method comprising the steps of:
 receiving a memory access request from said CPU;
 determining whether said memory access request is a read request;
 if said memory access request is a read request, issuing an advanced speculative read request to a cache data controller, and sending a cache entry number of said read request to a cache tag section;
 reading out a cache tag of said cache entry number from said cache tag section;
 determining whether said cache tag read out hits a cache tag of said read request; and
 upon a hit, issuing a read request to said cache controller.

11. A cache data control method according to claim 10, wherein if a cache miss occurs between the cache tag read out from said cache tag section and the cache tag of said read request, said cache data control method further comprises the steps of:
 issuing a read request to said memory; and
 registering the cache tag of said memory access request with said cache tag section.

12. A cache data control method according to claim 10, wherein if the request received from the CPU is a write request, said cache data control method further comprises the steps of:
 reading a cache tag from said cache tag section and determining whether a cache hit has occurred;
 if as a result of said determination a cache hit has occurred, issuing a write request to said cache data controller; and
 sending write data from a data buffer to said cache data controller.

13. A cache data control method according to claim 12, wherein if the determination on the cache tag read out from said cache tag section results in a cache miss, said cache data control method further comprises the steps of:
 issuing a write request to said memory; and
 sending write data from the data buffer to said memory.

14. A computer system according claim 1, wherein said cache is a set associative cache.

15. A cache data control method according to claim 5, wherein a set associative cache is used as said cache.

16. A computer system including a CPU, a memory, and a cache located in a hierarchy class between said CPU and said memory, said computer system comprising:
 a coherent controller and a cache data controller, said cache including a cache tag section and a cache data section which operate independently from each other,
 wherein said coherent controller refers to said cache tag section in response to a read request including a request address from said CPU to determine whether said read request is a cache hit or a cache miss;
 wherein said coherent controller further issues in response to said read request, a speculative read request including at least a part of said request address before said determination;
 wherein said coherent controller further issues a read request in response to a decision of cache hit in said determination;
 wherein said cache data controller reads a cache data from said cache data section in response to said speculative read request from said coherent controller and holds the read cache data into a hold buffer; and
 wherein said cache data controller sends said cache data held in the hold buffer as a reply data in response to said read request issued by said coherent controller.

17. A computer system according to claim 16, wherein said coherent controller issues a read request to said memory in response to a decision of cache miss in said determination.

18. A computer system according to claim 17, wherein said coherent controller issues a request for discarding the speculative read request in response to a decision of cache miss in said determination, and said cache data controller invalidates said cache data held in said hold buffer in response to said request for discarding the speculative read request issued by said coherent controller.

19. A computer system according to claim 16, wherein said hold buffer in the cache data controller comprises:
   a speculative read request buffer which holds said request for discarding the speculative read request issued by said coherent controller; and
   a speculative read data buffer which holds said cache data read from said cache data section; said speculative read request buffer and said speculative read data buffer including a plurality of entries corresponding to each other;
   wherein said corresponding entries holding said speculative read request and said cache data read from said cache data section in response to that speculative read request; and
   in response to said read request issued by said coherent controller, said cache data controller sends said cache data as a reply data from the entry of a corresponding speculative read data buffer when said speculative read request corresponding to said read request is present in said the entry of said speculative read request buffer.

20. A computer system according to claim 19, wherein said coherent controller refers to said cache tag section in response to a write request including a request address from said CPU to determine whether said write request is a cache hit or a cache miss;
   said coherent controller further issues a write request in response to a decision of cache hit in said determination;
   said cache data controller responds to said write request from said coherent controller, and
   if said speculative read request having the same address as that of said write request is present in the entry of said speculative read request buffer, invalidates that entry, and writes data of said write request into said cache data section.

21. A method of performing speculative read control of cache data in a computer system including a CPU, a memory, and a cache located in a hierarchy class between said CPU and said memory, said cache including a cache tag section and a cache data section which operate independently from each other, comprising the steps of:
   referring to said cache tag section in response to a read request including a request address from said CPU;
   issuing, in response to said read request, a speculative read request including at least a part of said request address in parallel to said referring-to;
   determining whether said read request is a cache hit or a cache miss by said referring-to;
   issuing a cache read request in response to a decision of cache hit in said determination;
   reading a cache data from said cache data section in response to said speculative read request and holding the read cache data into a hold buffer; and
   sending said cache data held in the hold buffer as a reply data in response to said cache read request.

22. A method according to claim 21, further comprising issuing a read request to said memory in response to a decision of said cache miss.

23. A method according to claim 22, further comprising issuing a request for discarding the speculative read request in response to a decision of cache miss, and invalidating said cache data held in said hold buffer in response to said request for discarding the speculative read request.

24. A method according to claim 21, further comprising referring to said cache tag section in response to a write request including a request address from said CPU;
   determining whether said write request is a cache hit or a cache miss by said referring-to;
   issuing a cache write request in response to a decision of said cache hit; responding to said write request, and if said speculative read request having the same address as that of said write request is present in said hold buffer, invalidating said speculative read request, and writing data into said cache data section.

* * * * *